(12) United States Patent
Jang

(10) Patent No.: US 12,036,822 B2
(45) Date of Patent: Jul. 16, 2024

(54) TIRE INCLUDING A PATTERN FORMING AREA WITH A UNIT PATTERN

(71) Applicant: HANKOOK TIRE & TECHNOLOGY CO., LTD., Seongnam-si (KR)

(72) Inventor: Hee Sung Jang, Seoul (KR)

(73) Assignee: HANKOOK TIRE & TECHNOLOGY CO., LTD., Seongnam-si (KR)

( * ) Notice: Subject to any disclaimer, the term of this patent is extended or adjusted under 35 U.S.C. 154(b) by 0 days.

(21) Appl. No.: 18/087,495

(22) Filed: Dec. 22, 2022

(65) Prior Publication Data

US 2023/0202242 A1 Jun. 29, 2023

(30) Foreign Application Priority Data

Dec. 29, 2021 (KR) .................. 10-2021-0190795

(51) Int. Cl.
  *B60C 13/00* (2006.01)
(52) U.S. Cl.
  CPC .................... *B60C 13/001* (2013.01)
(58) Field of Classification Search
  CPC ........ B60C 13/001; B60C 13/02; B60C 13/00
  See application file for complete search history.

(56) References Cited

U.S. PATENT DOCUMENTS

| 2020/0070591 A1* | 3/2020 | Debordeaux | ......... B60C 13/001 |
| 2023/0068330 A1* | 3/2023 | Kamada | ............... B60C 13/001 |

FOREIGN PATENT DOCUMENTS

DE 102019219311 A1 * 6/2021

OTHER PUBLICATIONS

DE 102019219311 Machine Translation; Bogenschutz, Peter (Year: 2021).*

* cited by examiner

*Primary Examiner* — Katelyn W Smith
*Assistant Examiner* — Nicholas J Weiler
(74) *Attorney, Agent, or Firm* — Bridgeway IP Law Group, PLLC; Jihun Kim

(57) ABSTRACT

Proposed is a tire including a pattern forming area provided on a sidewall to display a pattern of predetermined shape, wherein the pattern forming area is formed by continuously arranging a plurality of hexagon-shaped unit patterns, and the unit patterns existing on the edges of the pattern forming area are cut off in shapes to correspond to the shape of the pattern forming area.

4 Claims, 5 Drawing Sheets

TIRE INCLUDING A PATTERN FORMING AREA WITH A UNIT PATTERN

BACKGROUND OF THE INVENTION

Field of the Invention

The present invention relates to a tire, and more specifically, to a tire including a pattern forming area with unit patterns that is capable of allowing the pattern forming area to be located on a sidewall thereof to continuously arrange the unit patterns with predetermined shapes, thereby improving an outer appearance quality thereof and allowing a degree of dirtiness occurring while a vehicle is driven to be reduced on an outer appearance thereof.

Background of the Related Art

Generally, tires are deformable ring-shaped objects made of rubber and mounted on wheels of a transportation vehicle such as an automobile, and the like, so that air is injected into the tires, the tires provide contacts between the transportation and a road surface to absorb impacts generated from uneven road surfaces.

The tires are very important parts that have to be needed in the transportation vehicle such as an automobile, and the like and thus play a very important role in ensuring safety of the transportation vehicle, together with an engine and safety devices. If the vehicle does not have any tires, it cannot ensure any ride-comfort and stability.

Further, the tire generally have given patterns engraved on the sidewalls thereof to represent trademarks, specification information, and the like, and in conventional practices, as shown in FIG. 1, patterns to be represented on the sidewall of a tire are engraved by given amounts to provide a rough tire surface.

According to such conventional pattern engraving method, however, the rough tire surface is exposed to the outside to make the outer appearance quality of the tire deteriorated totally, and further, dirty substances may be easily attached to the rough tire surface to cause a degree of dirtiness of the tire to be raised, so that the tire may age at a fast speed.

Accordingly, there is a definite need to solve the above-mentioned problems the conventional tires have had.

SUMMARY OF THE INVENTION

Accordingly, the present invention has been made in view of the above-mentioned problems occurring in the related art, and it is an object of the present invention to provide a tire including a pattern forming area with unit patterns that is capable of allowing an outer appearance quality thereof to be improved to thus ensure a high degree of beauty and allowing a degree of dirtiness occurring while a vehicle is driven to be reduced on an outer appearance thereof.

To accomplish the above-mentioned objects, according to the present invention, there is provided a tire including a pattern forming area provided on a sidewall to display a pattern of predetermined shape, wherein the pattern forming area is formed by continuously arranging a plurality of hexagon-shaped unit patterns, and the unit patterns existing on the edges of the pattern forming area are cut off in shapes to correspond to the shape of the pattern forming area.

According to the present invention, desirably, the unit pattern may include a plurality of concaved portions arranged side by side in predetermined shapes thereon.

According to the present invention, desirably, each unit pattern may be divided into a center area and a pair of side areas located on both sides of the center area with respect to a pair of imaginary extension lines extending from both peaks of a first side thereof to separated points on a second side located on the opposite side to the first side, and each concave portion may extend long over the center area and the pair of side areas.

According to the present invention, desirably, each concave portion may have a shape bent along an outer shape of the unit pattern on the boundaries between the center area and the pair of side areas.

According to the present invention, desirably, the plurality of concave portions may be formed such that angle bent on the center area and the pair of side areas gradually decreases from the first side to the second side of the unit pattern.

According to the present invention, desirably, the unit pattern may have outer edge portions protruding more than the concave portions.

According to the present invention, desirably, the neighboring unit patterns may have a shape formed by continuously connecting the outer edge portions to each other.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
FIG. 1 shows patterns engraved on a conventional tire.

The present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

When it is said that one element is described as being "connected" or "coupled" to the other element, one element may be directly connected or coupled to the other element, but it should be understood that another element may be present between the two elements. In contrast, when it is said that one element is described as being "directly connected" or "directly coupled" to the other element, it should be understood that another element is not present between the two elements.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Hereinafter, an embodiment of the present invention will be explained in detail with reference to the attached drawings.

Figure 2:
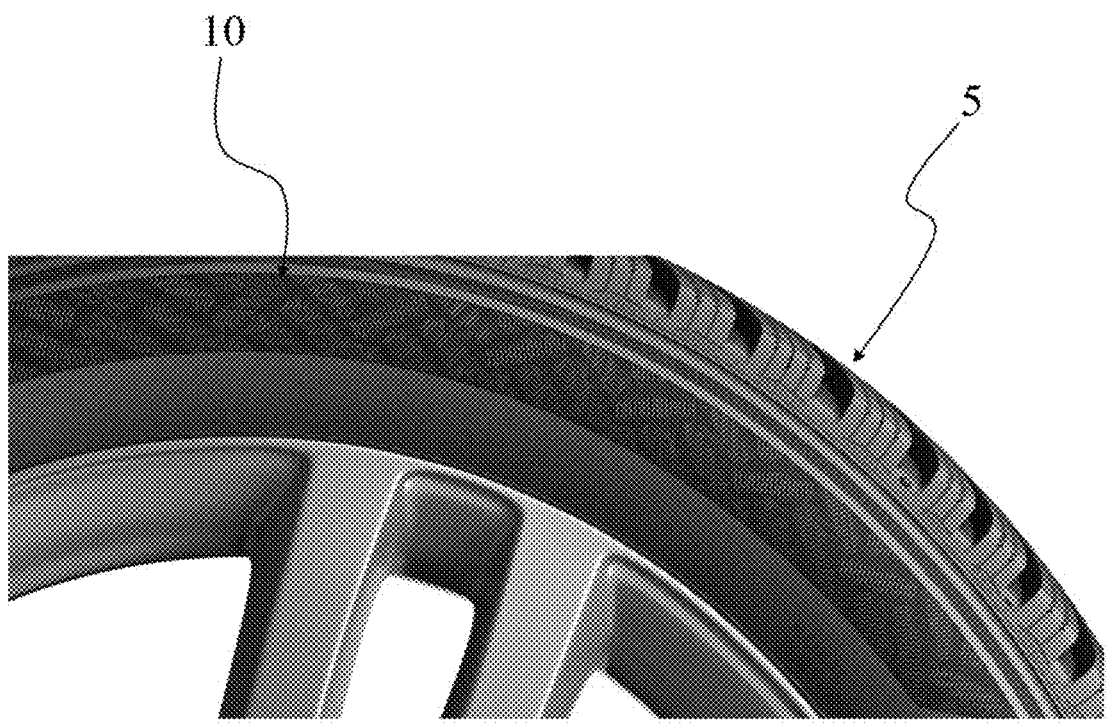
FIG. 2 shows a tire according to the present invention that has a pattern forming area formed on a sidewall thereof.
Figure 3:
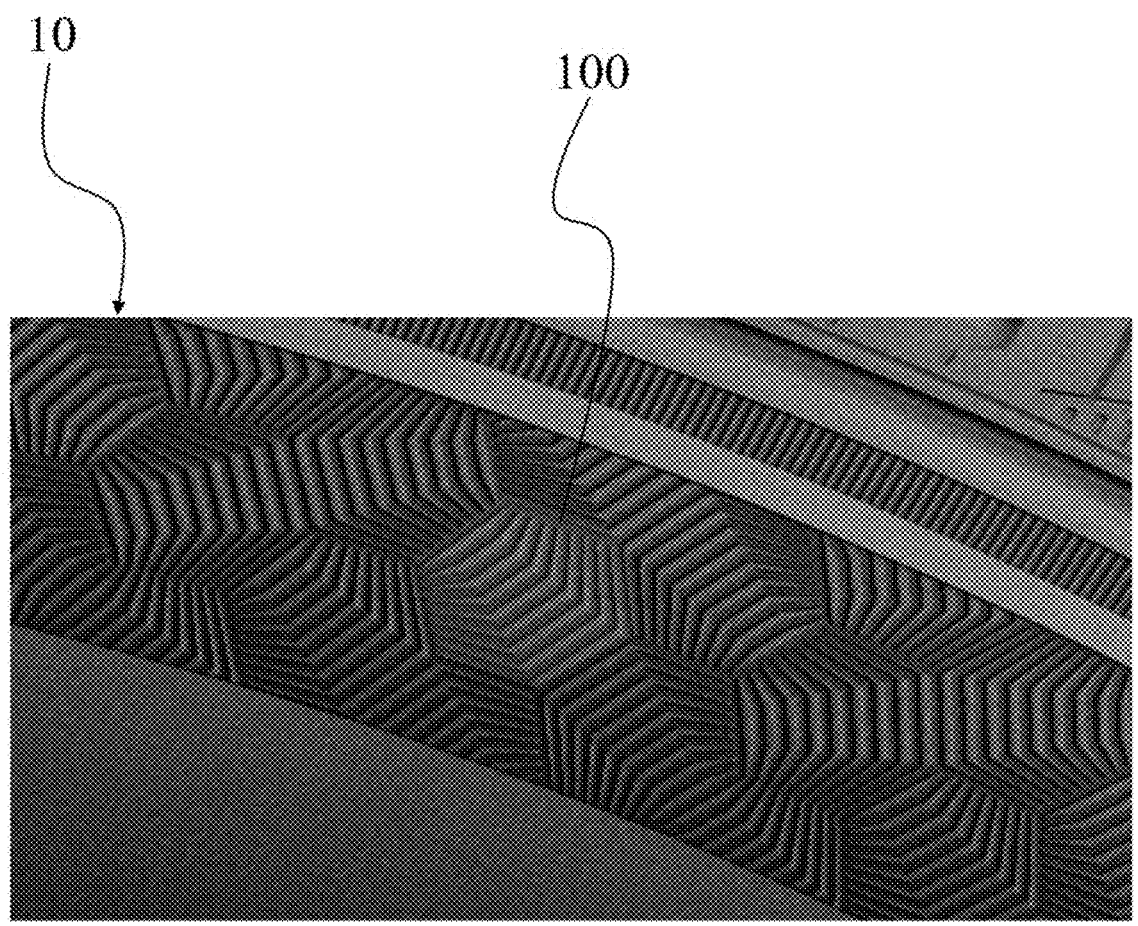
FIG. 3 is an enlarged view showing the pattern forming area formed on the sidewall of the tire of the present invention.

FIG. 2 shows a tire according to the present invention that has a pattern forming area formed on a sidewall thereof, and FIG. 3 is an enlarged view showing the pattern forming area formed on the sidewall of the tire of the present invention.

As shown in FIGS. 2 and 3, a tire 5 according to the present invention includes a pattern forming area 10 provided on a sidewall to display a pattern of predetermined shape. In this case, a general structure of the tire 5 excepting the pattern forming area 10 is obvious to those skilled in the art, and therefore, an explanation of the general structure will be avoided.

According to the present invention, the pattern forming area 10 has a plurality of hexagon shaped unit patterns 100 arranged continuously thereon, and accordingly, the pattern forming area 10 is filled with the unit patterns 100, without any empty space. Each unit pattern 100 may have the shape of a regular hexagon.

However, the unit patterns 100 existing on the edges of the pattern forming area 10 are cut off in shapes to correspond to the shape of the pattern forming area 10.

That is, the tire 5 according to the present invention is provided with the pattern forming area 10 having a new shape, while not having the patterns represented with planar contrast in the conventional practices, thereby greatly improving an outer appearance quality thereof.

Now, an explanation of the unit patterns 100 will be given in more detail below.

Figure 4:
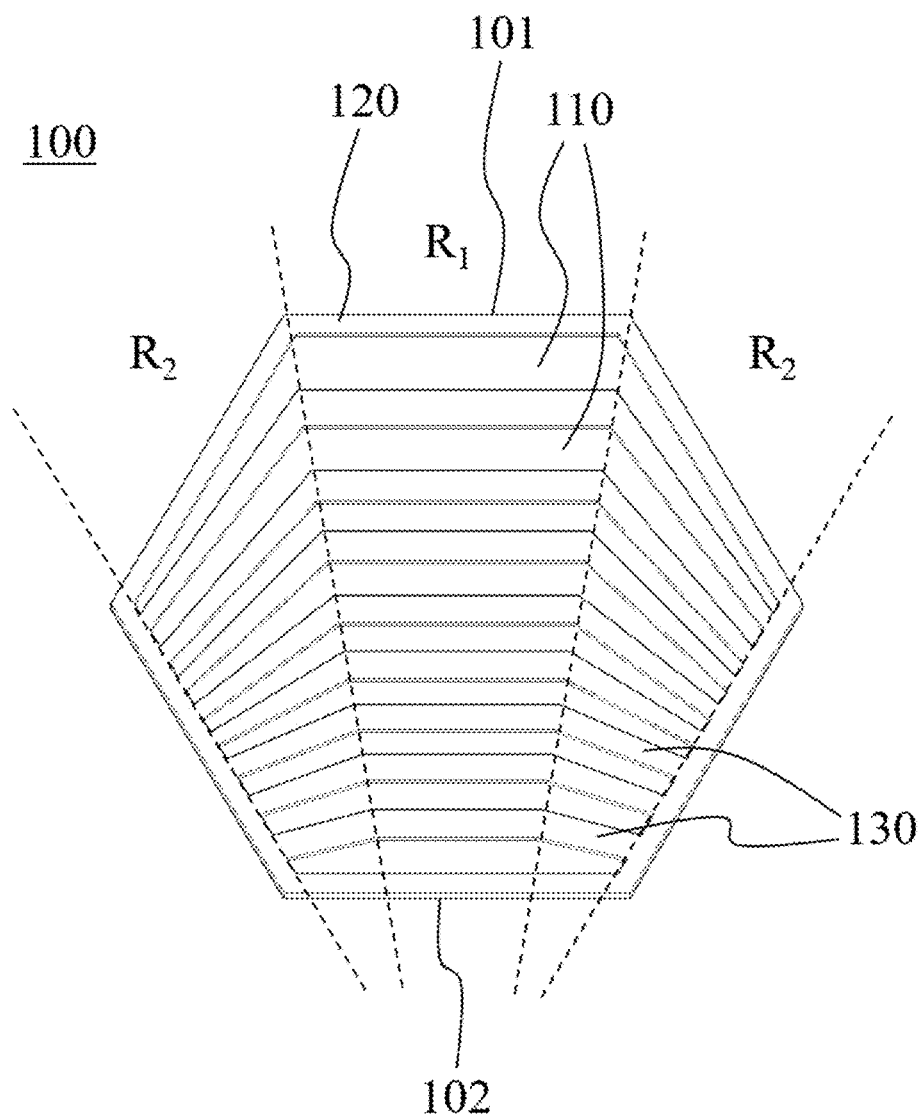
FIGS. 4 and 5 show the unit patterns of the pattern forming area formed on the sidewall of the tire of the present invention.
Figure 5:
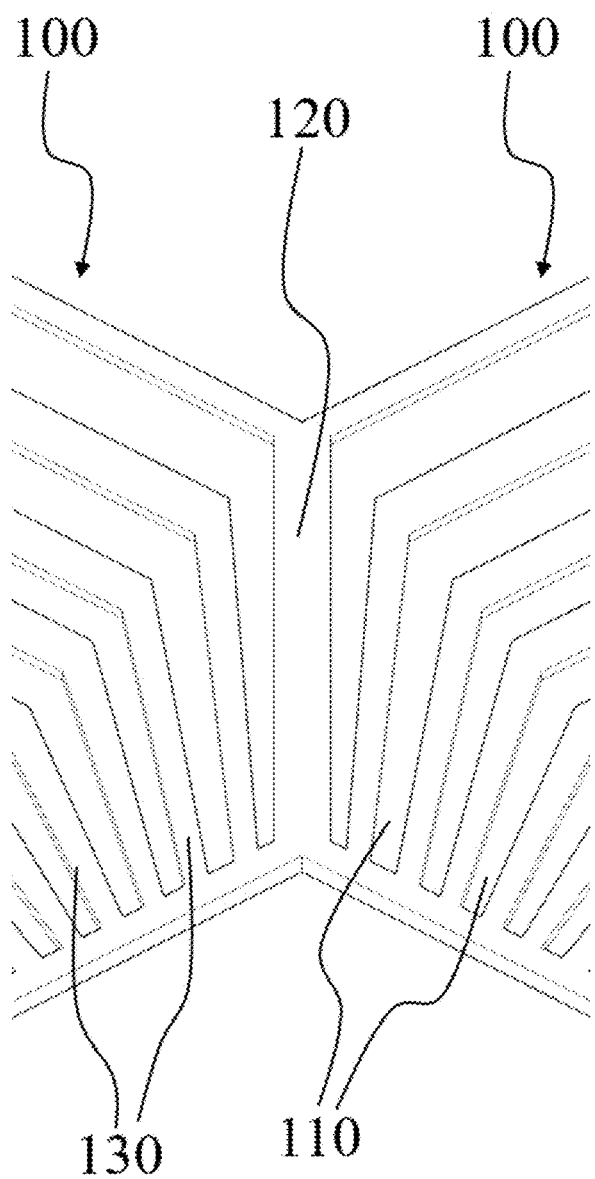

FIGS. 4 and 5 show the unit patterns 100 of the pattern forming area 10 formed on the sidewall of the tire of the present invention.

As shown in FIGS. 4 and 5, the unit pattern 100 includes a plurality of concaved portions 110 arranged side by side in a predetermined shape thereon and a plurality of protruding portions 130 formed between the neighboring concaved portions 110.

Further, the unit pattern 100 includes outer edge portions 120 protruding more than the concaved portions 110. According to the present invention, the sides of the unit pattern 100 are closed by means of the outer edge portions 120, and the concaved portions 110 are formed inside the outer edge portions 120. Otherwise, the outer edge portions 120 may have the same heights as the concaved portions 110, and even in this case, the unit pattern 100 may be kept in shape, without any change.

According to the present invention, the unit pattern 100 is divided into a center area $R_1$ and a pair of side areas $R_2$ located on both sides of the center area $R_1$ with respect to a pair of imaginary extension lines extending from both peaks of a first side 101 as any one of six sides thereof to separated points on a second side 102 located on the opposite side to the first side 101.

In this case, each concave portion 110 may extend long over the center area $R_1$ and the pair of side areas $R_2$.

In specific, each concave portion 110 has a shape bent along an outer shape of the unit pattern 100 on the boundaries between the center area $R_1$ and the pair of side areas $R_2$.

According to the present invention, the tire 5 represents the unit patterns 100 three-dimensionally by the optical illusion of the concave portions 110 because of the bent shapes of the concave portions 110.

Further, the concave portions 110 are formed such that angle bent on the center area $R_1$ and the pair of side areas $R_2$ gradually decreases from the first side 101 to the second side 102 of the unit pattern 100. Accordingly, the unit pattern 100 is filled with the concave portions 110, without any empty space.

According to the present invention, further, the unit patterns 100 are arranged in the pattern forming area 10 in different directions from one another. That is, the concave portions 110 of the plurality of unit patterns 100 are arranged side by side, and otherwise, they may be arranged at different angles from one another.

As shown in FIG. 5, further, the neighboring unit patterns 100 are connected to each other, without any stepped portion, because their outer edge portions 120 are continuously connected to each other. In specific, the neighboring unit patterns 100 are formed to share their outer edge portions 120 with each other, thereby improving the tire's beauty. In FIG. 5, the outer edge portion 120 protrudes more than the concave portion 110, but it is possible that the outer edge portion 120 may have the same height as the concave portion 110.

As described above, the tire according to the present invention allows the pattern forming area to be located on the sidewall thereof to continuously arrange the unit patterns with hexagonal shapes thereon, thereby improving an outer appearance quality thereof to ensure a high degree of beauty.

Further, the tire according to the present invention allows a degree of dirtiness occurring while a vehicle is driven to be not remarkably visible on the outer appearance thereof and allows the surface of the pattern forming area to be sophisticatedly formed thereon when seen, thereby greatly reducing a surface dirtiness speed caused by the vehicle's driving.

As mentioned above, the preferred embodiment of the present invention has been disclosed in the specification and drawings. Therefore, persons skilled in the relevant art can appreciate that many modifications and variations are possible in light of the above teachings. It is not intended to be exhaustive or to limit the invention to the precise forms disclosed. For example, the parts expressed in a singular form may be dispersedly provided, and in the same manner as above, the parts dispersed may be combined with each other.

Thus, although the invention has been described with respect to specific embodiments, it will be appreciated that the invention is intended to cover all modifications and equivalents within the scope of the following claims.

What is claimed is:

1. A tire comprising a pattern forming area positioned on a sidewall to display a pattern of predetermined shape, wherein the pattern forming area includes a plurality of hexagon-shaped unit patterns continuously arranged thereon, and the unit patterns existing on edges of the pattern forming area are cut off in shapes to correspond to a shape of the pattern forming area, wherein each unit pattern comprises a plurality of concaved portions arranged side by side in predetermined shapes thereon, wherein each unit pattern is divided into a center area and a pair of side areas located on both sides of the center area with respect to a pair of imaginary extension lines extending from both peaks of a first side thereof to separated points on a second side located on an opposite side to the first side, and each concaved portion extends over the center area and the pair of side areas, wherein each concaved portion extends along an outer shape of the unit pattern and bends at the pair of imaginary extension lines between the center area and the pair of side areas.

2. The tire according to claim 1, wherein an angle of the concaved portions formed between the center area and the pair of side areas gradually decreases from the first side to the second side of the unit pattern.

3. The tire according to claim 1, wherein each unit pattern has outer edge portions protruding higher than the concaved portions.

4. The tire according to claim 3, wherein outer edge portions of neighboring unit patterns of the plurality of unit patterns are continuously connected to each other.

\* \* \* \* \*